United States Patent Office 3,483,789
Patented Dec. 16, 1969

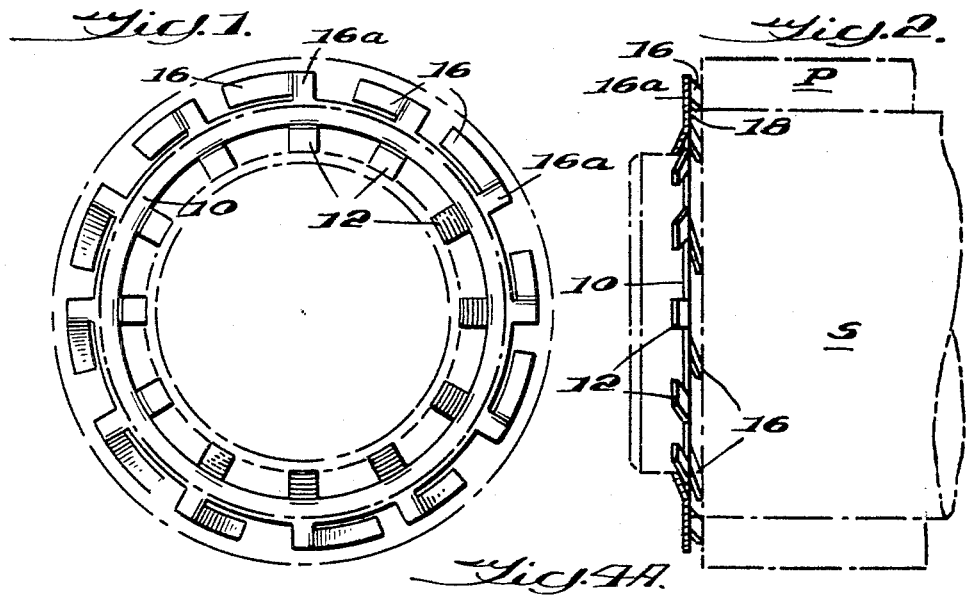
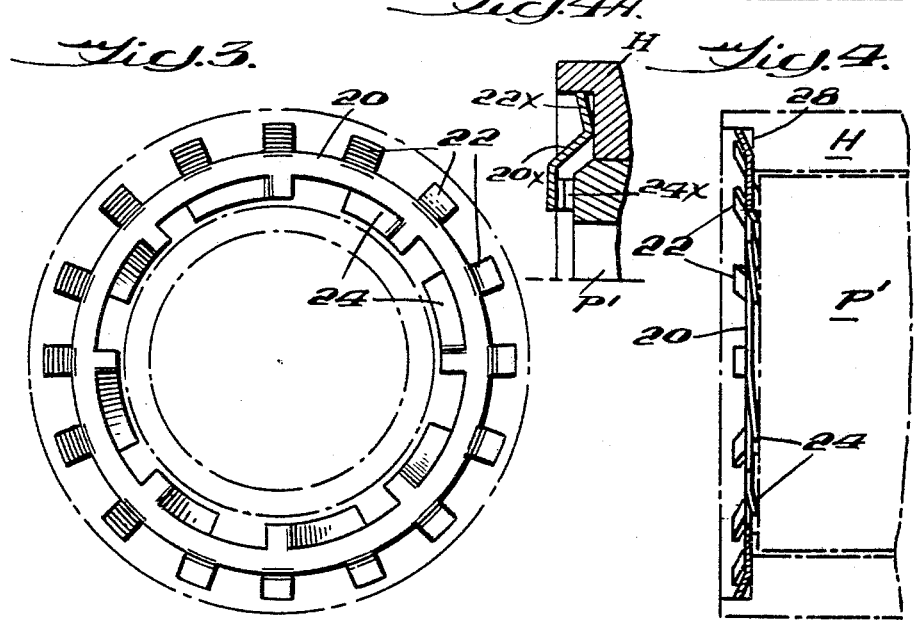
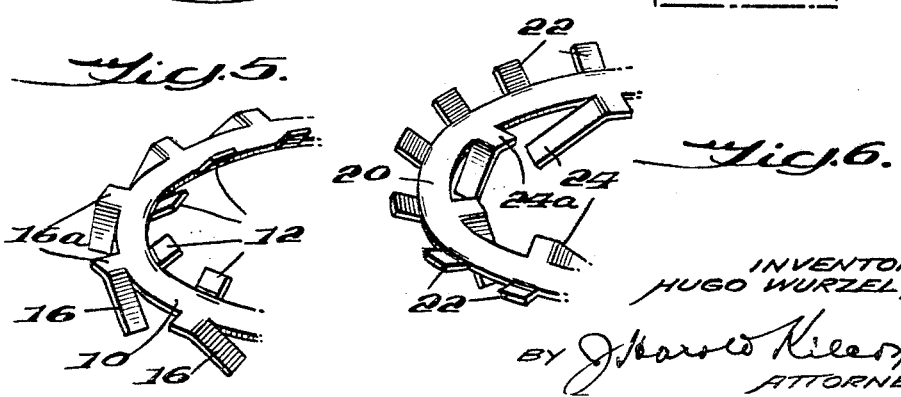

3,483,789
SELF-LOCKING RETAINING RINGS
Hugo Wurzel, New York, N.Y., assignor to Waldes Kohinoor, Inc., Long Island City, N.Y., a corporation of New York
Filed Nov. 20, 1967, Ser. No. 684,104
Int. Cl. F16b *21/00, 17/00*
U.S. Cl. 85—8.8                                                13 Claims

ABSTRACT OF THE DISCLOSURE

The present disclosure is that of a self-locking retaining ring provided along its edge opposite to that from which its conventional spring locking prongs project with circumferentially extending spring fingers which incline toward the machine part to be retained, whereby when the ring during the course of its being assembled is shifted axially along a carrier member, i.e. a shaft or housing bore to its part-retaining position, the spring fingers will engage the machine part and exert a spring pressure thereon, thus serving to load and/or position said part. The disclosure also relates to an assembly or assemblies employing such a self-locking retaining ring, wherein the carrier member is provided with a fixed ring positioning shoulder or step which determines the reaction plane provided by the ring body against which the spring fingers act to impose their resilient machine-part loading and/or positioning effect.

---

This invention relates to improvements in self-locking retaining rings and assemblies employing same and, with regard to its more specific aspects, to a self-locking retaining ring incorporating means for applying spring pressure on the machine part retained thereby.

As is well known, the self-locking retaining ring of the prior art, for use in forming an artificial shoulder on a shaft or in a housing bore which serves to locate a machine part such as a gear, bearing race or the like in relatively fixed position on said shaft or in said bore, comprises a closed circular ring body or annulus of sheet metal provided with a plurality of integral spring prongs which project from an edge thereof (from the inner edge if the ring is of the external form which is adapted to be mounted on a shaft and from the outer edge if the ring is of the internal form which is adapted to be inserted in a housing bore) and which prongs are inclined by a small angle to the plane of the ring body, the free end edges thereof lying on a circle of diameter substantially equal to the diameter of the shaft or housing bore, as provides for the free ends of the prongs tending to bite into the surface of the ring carrier in manner as to lock the ring thereto against movement in the direction towards which the prongs incline. By the expression "a circle of diameter substantially equal to the diameter of the shaft or housing bore," as used in the foregoing and hereinafter, is meant a circle having diameter slightly les than that of the shaft for the external ring and a circle having diameter slightly greater than that of the housing bore for the internal ring.

The holding power of such a ring in its assembly against thrusts exerted by the machine part located thereby depends on several factors which are independent of one another. One such factor is the shear strength of the material of the ring carrier, assuming of course that this material is not so hard as to make the locking prongs wholly ineffective. Another factor is the strength of the closed rim or body of the ring on which depends its resistance to disortion under the forces transmitted to it by the prongs and being effective in the direction of the latter. A third factor is the resistance of the prongs to buckling under load.

Stated broadly, a principal object of the present invention is to extend the use of self-locking retaining rings to applications wherein it has been found desirable or is considered necessary that the ring apply a positive resilient presure on the retained part as effects what may be termed a spring loading thereof.

A more particular object of the invention is the provision of a self-locking retaining ring possessing all of the known advantages of the standard or prior art self-locking ring, but which additionally incorporates means for applying a positive bias or force on the machine part retained by the ring proper, which may be utilized to advantage, for example, to cushion the shock loads likely to be imparted to the ring proper by the retained machine part or to retain said machine part at different locations under different loads as may be desirable in certain electrical or mechanical constructions.

Yet another object of the invention is the provision of an improved assembly of carrier member, i.e. a shaft or housing having a bore, a machine part to be retained on or in said member at a predetermined axial position or positions therealong, and a self-locking retaining ring for retaining said machine part as aforesaid and which further incorporates means for imparting an axially directed resilient force or load on said machine part, wherein the carrier member is provided with an axially facing step or shoulder serving to determine a fixed stop position for the retaining ring which determines the reaction plane of the ring from which the resilient loading means act to impose their loading and/or positioning effect on the machine part as required for the particular application in which such an assembly is employed.

The above and other objects and features of advantage of an improved self-locking retaining ring and assembly employing same according to the present invention will more fully appear from the following detailed description thereof, taken with the accompanying drawings, in which—

FIG. 1 is a plan view of a self-locking retaining ring of the external form incorporating the improvements of the present invention;

FIG. 2 is a sectional view taken along the vertical center line of FIG. 1, and further illustrating the manner of assembly of an external self-locking ring of the invention on a shaft-type carrier member so that it provides a fixed position, resilient locating shoulder for a machine part mounted thereon, wherein both the shaft and retained part are shown in phantom;

FIG. 3 is a plan view of a self-locking ring of the internal form which incorporates the improvements of the invention;

FIG. 4 is a section taken along the vertical center line of FIG. 3, and further illustrating the manner of assembly of said internal ring in the bore of a housing-type carrier member, and FIG. 4A is a similar view of an assembly employing a reinforced version of said internal ring;

FIGS. 5 and 6 are fragmentary perspective views of the improved external and internal forms of retaining ring shown in FIGS. 1 and 3, respectively.

Referring to the drawings in detail, and first considering FIGS. 1, 2 and 5 which, as just previously stated, depict the improved external forms of self-locking retaining ring according to the invention, reference numeral 10 designates a closed circular ring body or annulus provided with a plurality of integral prongs 12 which extend radially inwardly from its inner edge and whose inner free edges lie on a circle having slightly smaller diameter than the diameter of the shaft on which the ring is designed to be assembled. As best seen in FIGS. 2 and 5, the aforesaid radially inwardly projecting fingers are bent slightly out of the plane of the ring body, with their angle of inclination being such that the friction exerted on the free edges thereof by the surface of a shaft along which the ring is shifted during the assembly operation tends to decrease as the ring moves in the direction of the machine part to be held and to increase upon force being exerted on the ring body in the opposite direction, for example by the machine part moving against said ring body. As is conventional, the width of said prongs 12 will be chosen so as to provide them with enough rigidity to resist buckling under the thrust load which the ring body is designed to withstand, yet to be able to flex more or less freely as the ring is being assembled. The length of the prongs will of course be determined by the diameter of the shaft on which the ring is to be assembled, since as previously stated the free end edges of the prongs must lie on a circle of slightly lesser diameter than that of said shaft.

According to the present invention, the ring body 10 carries means for exerting a resilient force or pressure on the machine part to be retained thereby, thus in effect providing a resilient shoulder as distinguished from the rigid shoulder provided by the ring body of the known self-locking rings. More particularly, the ring body 10 carries along its outer edge a plurality of integral, circumferentially extending spring fingers 16 which incline away from the plane of the ring body in the direction opposite to that of the aforesaid locking prongs 12, with the expression "circumferentially extending" as just used and when used hereinafter meaning that said spring fingers extend along arcs of a circle which is concentric with that of the ring body 12. Preferably, said circumferentially extending spring fingers are made integral with the ring body by forming the latter with radially outwardly projecting tongue-like formations 16a, from corresponding side edges of which the spring fingers proper extend in the same direction and along arcs of a circle concentric with that of said ring body.

By reference to FIG. 2, it will be seen that as the self-locking retaining ring according to the invention is assembled on a shaft S by being pushed over the end thereof by an amount as to bring the free ends of the circumferentially extending spring fingers 16 into engagement with the adjacent end face of a machine part P such as a gear, bearing race or the like required to be mounted on said shaft, not only will the locking prongs 12 provided on the body 10 of said retaining ring frictionally secure the ring to the shaft S, but also the circumferentially extending, inclined spring fingers will be disposed to apply a resilient force or load on the machine part P.

Preferably, the shaft S is provided with means for establishing a fixed ring-stop position beyond which the ring cannot be further pushed along the shaft, which position in turn determines the reaction plane of the ring from which the spring fingers will start to impose their resilient loading and/or positioning force on said machine part. Illustratively, such means comprises an axially directed step or shoulder 18 on the shaft provided by forming the end portion of the shaft which receives and mounts the ring with a diameter which is less than the machine-part carrying portion of the shaft by an amount resulting in the shoulder having the necessary height as to be engageable by the body 10 of the ring. Thus, when the ring body 10 is pushed tight against the shoulder 18 and locked in place by the locking effect of the locking prongs, it provides a fixed annulus against which the circumferentially extending spring fingers 16 may react.

By proper design, said spring fingers 16 will allow the retained part P to move a limited distance towards the so fixedly held ring body 10, and thus said spring fingers are capable of cushioning the ring against sudden shock loads likely to be applied thereagainst by the retained machine part. And by making the circumferentially extending spring fingers 16 longer or shorter, the cushioning power thereof can be varied in a predetermined manner. Furthermore, by varying the length and/or stiffness of the fingers 16, they can be made to function as a means for holding the machine part P at different axial locations along the shaft which are related to different loads applied thereto. This is a feature of advantage in that a unitary retaining ring constructed according to the invention becomes capable of locating the axial position of a machine part on a shaft in accordance with its loading simply by setting the spring bias exerted by the fingers so that the machine part retained thereby will assume one position for one load, a second position for another load, and so on, which in certain electrical and/or mechanical construction is highly desirable.

Next considering FIGS. 3, 4 and 6, it will be seen that these views illustrate the improved internal form of self-locking ring according to the invention. Such ring form also comprises a closed circular ring body designated 20 having integral locking prongs 22 and circumferentially extending spring fingers 24 comparing to the aforesaid ring body 10 shown in FIG. 1 and its locking prongs and circumferentially extending spring fingers but, being an internal ring adapted to be assembled in a housing bore, the locking prongs 22 project radially outwardly from the outer edge of the ring body 20 so as to be disposed to lock to the bore surface, and the circumferentially extending spring fingers 24 project inwardly from and thence extend circumferentially along the inner edge of said ring body.

A typical assembly employing an internal self-locking retaining ring as just described is shown in FIG. 4, wherein H indicates a housing having a cylindrical bore and P′ a machine part disposed within the bore and being located axially therealong by said internal ring. Preferably, there is provided in the bore a ring-stop shoulder 28 comparing in function to the previously described ring-stop shoulder 18 provided on the shaft S. Illustratively, said shoulder 28 is defined by the annular bottom wall of a counterbore which opens into the main cylindrical bore. Thus, as will be clear from FIG. 4, when the ring 20, 22, 24 is inserted into the housing bore and shifted along same until its annular body portion is locked tight against the shoulder 28 and thereby in a fixed axial plane or position with respect to the bore proper, the free ends of the circumferentially extending spring fingers 24 are disposed to press against the end face of the machine part P′ to be retained and, by proper design of the various parts making up the assembly, will exert a predetermined resilient pressure against said machine part P′. Thus, as distinguished from prior self-locking retaining rings which provide a rigid retaining shoulder, the retaining ring of the invention provides in effect a resilient shoulder which allows the retained machine part P′ to move a limited distance towards the secured body 20 of the ring, thus cushioning the ring against suddenly applied shock loads likely to be transmitted thereto by said machine part. Furthermore, by varying the length and/or stiffness of the circumferentially extending spring fingers 24, the ring as a whole may be employed to position the machine part P′ within the bore in different axial positions therealong which are related to different loads, just as the external ring may be so employed as earlier described.

While the ring body 20 of the internal form of retaining ring illustrated in FIGS. 3, 4, and 6 has been shown to be flat or planar, it may, for added strength or reinforcement as needed, have the truncated configuration shown in FIG. 4A, wherein reference numerals 20x designate the ring body, 22x the locking prongs, and 24x the circumferentially extending spring fingers. It is also possible to supply added strength or reinforcement as needed to the external form of retaining ring shown in FIGS. 1, 2 and 5 by providing the ring body 10 thereof with truncated configuration corresponding to that shown in FIG. 4A.

Without further analysis, it will be appreciated that each of the external and internal forms of self-locking retaining rings constructed according to the principles of the invention and the improved assemblies employing same are capable of achieving the stated objectives therefor in simple yet effective and thoroughly dependable manner. However, many changes could be made in carrying out the above constructions.

I claim:
1. A self-locking retaining ring for forming a resilient locating shoulder for a machine part to be retained on or in a carrier member such as a shaft, a housing having a bore or the like, comprising: a closed circular ring body having a plurality of integral, spaced-apart spring locking prongs which extend generally radially from an edge thereof and incline in one axial direction from the ring body by a small angle and whose free end edges lie on a circle of diameter substantially equal to the diameter of said shaft or housing bore; and said ring body further having on its edge opposite that from which said prongs extend a plurality of integral, spaced-apart tongue-like formations which extend generally radially therefrom; and a plurality of spring fingers integrally connected at their corresponding one ends only to said tongue-like formations and extending circumferentially and in the same direction therefrom along arcs of a circle which is concentric with that of said ring body and further inclining from the ring body in the opposite axial direction; and the length and stiffness of said spring fingers being such that they are effective to apply a predetermined spring pressure on said machine part when the ring during the course of its assembly on said shaft or in its housing bore is moved against said machine part.

2. A self-locking retaining ring according to claim 1, wherein the locking prongs extend radially-inwardly from the inner edge of the ring body and the tongue-like formations extend radially from the outer edge of the ring body, as disposes said spring fingers along said outer edge.

3. A self-locking retaining ring according to claim 1, wherein the locking prongs extend radially-outwardly from the outer edge of the ring body and said tongue-like formations extend radially-inwardly from the inner edge of said ring body, as disposes said spring fingers along said inner edge.

4. A self-locking retaining ring according to claim 1, wherein said ring body is planar.

5. A self-locking retaining ring according to claim 1, wherein said ring body has the configuration of a truncated cone.

6. The combination of a carrier member having a cylindrical surface providing a machine-part mounting surface, a machine part operatively disposed on said surface and a self-locking retaining ring locating said machine part axially along said surface, said retaining ring comprising a closed circular ring body provided with a plurality of spaced-apart spring locking prongs which extend radially from an edge thereof and incline in one direction from said ring body and away from said machine part by a small angle and whose free edges engage said carrier surface in manner as to lock thereto and thereby secure the ring to said carrier member, said ring body being further provided on its edge opposite that from which said prongs extend with a plurality of integral, spaced-apart tongue-like formations which extend generally radially therefrom, and a plurality of spring fingers integrally connected at their corresponding one ends only to said tongue-like formations and extending circumferentially and in the same direction therefrom along arcs of a circle which is concentric with that of said ring body and whose free ends incline from said ring body in the direction of said machine part, said ring having a secured position along said surface which is such as to cause said spring fingers to bear with spring force against an end face of said machine part, and the length and stiffness of said spring fingers being such as to enable variation of said force in a predetermined manner.

7. The combination as set forth in claim 6, wherein said ring body is planar.

8. The combination as set forth in claim 6, wherein said ring body has the configuration of a truncated cone.

9. The combination as set forth in claim 6, wherein said carrier member is provided with ring-stop means for determining said secured position of the ring.

10. The combination as set forth in claim 6, wherein said carrier member comprises a shaft, said locking prongs project radially inwardly from the inner edge of said ring body and lockingly engage the surface of said shaft and said tongue-like formations project radially from the outer edge of said ring body as disposes said plurality of spring fingers along said outer edge.

11. The combination as set forth in claim 10, wherein said shaft is formed with an annular shoulder against which said ring body is held by the action of the locking prongs and which defines the secured position of said ring.

12. The combination as set forth in claim 6, wherein said carrier member comprises a housing having a bore in which said machine part and retaining ring are disposed, and wherein the locking prongs provided on the ring body extend radially-outwardly therefrom and secure said ring body to the bore surface and the tongue-like formations extend radially-inwardly from said ring body, as disposes the circumferentially extending spring fingers along the inner edge of said ring body.

13. The combination as set forth in claim 12, wherein said bore is formed with an annular shoulder against which said ring body is held by the action of the locking prongs and which defines the secured position of the ring.

References Cited

UNITED STATES PATENTS

| | | | |
|---|---|---|---|
| 2,275,058 | 3/1942 | Draving | 85—36 |
| 2,354,748 | 8/1944 | Franklin | 85—8.8 |
| 2,401,207 | 5/1946 | Wagstaff | 85—36 |
| 2,401,856 | 6/1946 | Brock | 85—8.8 |
| 2,798,748 | 7/1957 | Maurer | 85—8.8 |
| 3,032,807 | 5/1962 | Lanius | 85—36 |
| 3,198,294 | 8/1965 | Stacy | 85—36 |

FOREIGN PATENTS

| | | |
|---|---|---|
| 1,073,115 | 3/1954 | France. |
| 627,059 | 7/1949 | Great Britain. |
| 682,578 | 11/1952 | Great Britain. |
| 702,932 | 1/1954 | Great Britain. |
| 911,832 | 11/1962 | Great Britain. |

MARION PARSONS, JR., Primary Examiner

U.S. Cl. X.R.

85—36